United States Patent
Hull et al.

[11] 3,911,796
[45] Oct. 14, 1975

[54] DIAPHRAGM

[75] Inventors: Charles R. Hull, Aurora; George E. Heikes, Jr., Denver; Maurice W. MacBeth, Lakewood; Ronald E. DiFrancia; Claude L. Henderson, both of Denver; Harlan E. Cluphf, Littleton, all of Colo.

[73] Assignee: The Gates Rubber Company, Denver, Colo.

[22] Filed: Aug. 19, 1974

[21] Appl. No.: 496,679

Related U.S. Application Data

[63] Continuation of Ser. No. 331,906, Feb. 12, 1973, abandoned.

[52] U.S. Cl. ............ 92/101; 92/99; 92/103 R
[51] Int. Cl.² .............. F01B 19/00; F16J 3/00
[58] Field of Search .......... 92/98 R, 99, 101, 103 R, 92/104

[56] References Cited
UNITED STATES PATENTS

| | | | |
|---|---|---|---|
| 2,545,857 | 3/1951 | Perkins et al. | 92/104 X |
| 3,135,173 | 6/1964 | Jack, Jr. | 92/103 |
| 3,435,734 | 4/1969 | Bushway et al. | 92/103 |
| 3,513,059 | 5/1970 | Prohaska | 92/103 X |
| 3,549,142 | 12/1970 | Tilton | 92/103 R X |

*Primary Examiner*—Martin P. Schwadron
*Assistant Examiner*—Abraham Hershkovitz
*Attorney, Agent, or Firm*—Raymond Fink; H. W. Oberg, Jr.; Curtis H. Castleman, Jr.

[57] ABSTRACT

The invention relates to diaphragms and particularly to flexible diaphragms used in fluid actuators for vehicle braking systems. The diaphragm is generally dish shaped in configuration and contains a flat top planar portion, a flanged portion and an annular sidewall. The diaphragm according to this invention is particularly characterized by the fact that, the interior surface of the shoulder diaphragm formed generally at the connecting portion of the top planar surface and the annular sidewall is provided with a multiple of protuberances on the interior shoulder area. The protuberances may be in the form of a multitude of buttons or bumps or circular or undulating circumferential ribs generally following the circumference of the shoulder.

4 Claims, 7 Drawing Figures

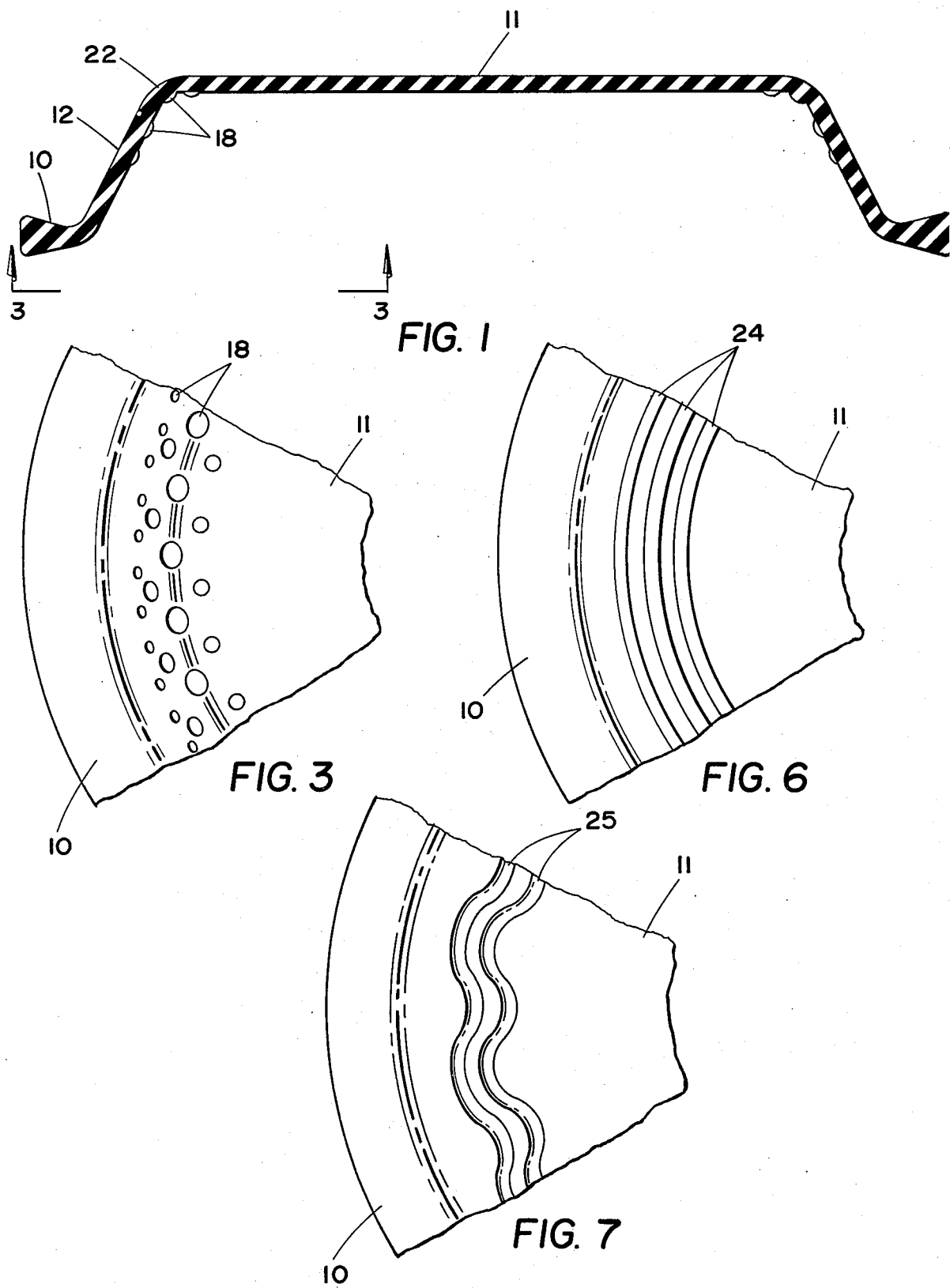

DIAPHRAGM

This is a continuation of application Ser. No. 331,906 filed Feb. 12, 1973, now abandoned.

BACKGROUND OF THE INVENTION

Braking systems generally used for tractor-trailer vehicles customarily use an air brake actuator for braking purposes. In the braking system a follower plate is activated generally with a diaphragm fabricated from rubber or rubberlike products. Generally, these diaphragms are internally fabric reinforced. Fluid pressure is generally introduced on one side, namely, the top side or outside of the top planar wall of the diaphragm which is therefore distorted by the fluid pressure to move at its central portion against a follower plate biased against the underside of the planar portion of the diaphragm to transmit movement to a brake actuator.

It has been noted that in some recent applications, displacement and misalignment of the push plate relative to the shoulder area of the diaphragm is becoming more common. In such cases of misalignment, the diaphragm must be able to accommodate the off-center type of misalignment of the follower plate against the interior shoulder area. Additionally, the diaphragm must be able to withstand abrasion and wear in the area of contact with the follower plate.

Some patents have been directed toward this objective of solving the abrasion problem. For instance, U.S. Pat. No. 3,435,734 to Bushway utilizes on the outside surface a stippled surface to allow a free flow of fluid during molding while sometimes also using spaced ribs along the inner surface to impart a greater degree of rigidity at the shoulder. Also, U.S. Pat. No. 3,135,173 to Jack utilizes internal ribs primarily to dispose any included fabric reinforcement layer away from the inner surface of the diaphragm.

SUMMARY OF THE INVENTION

The current invention is particularly directed toward an improved modification of the internal surface area of the shoulder of the diaphragm in order to accommodate particularly misalignment of the follower plate in the shoulder area of the inner surface of the diaphragm. In order to accomplish this a multitude or plurality of internal protuberances are supplied along the inner surface of the shoulder area of the diaphragm. Preferably, the protuberances are in the form of buttons or truncated pyramids having a maximum height in the immediate area of the shoulder and decreasing in height as the shoulder tapers toward either the top planar surface or the sidewall annulus. The protuberances may also be in the form of concentric circumferential ridges which may either run straight along the shoulder area or may be in the form of undulating ribs or ridges. Again, the maximum height of the protuberance is generally at the immediate shoulder area with decreasing heights as the protuberance is closer to either the top planar surface or the sidewall annulus.

It is therefore an object of this invention to provide an improved modification to accommodate misalignment of the follower plate in the shoulder area of the interior surface of the diaphragm.

It is a further object of this invention to provide maximum abrasion resistance particularly due to misalignment of the follower plate against the diaphragm.

Further objects and advantages within the scope and comprehension of this invention will be apparent from the following description and reference to the annexed drawings in which:

FIG. 1 is a sectional plan view of a flexible rubber diaphragm embodied in the present invention.

FIG. 3 is a section showing a portion of the inner surface of the diaphragm embodied in the current invention.

FIG. 6 is a sectional plan showing a ribbed modification.

FIG. 7 is a sectional plan showing an undulating ribbed modification.

DESCRIPTION OF THE PREFERRED EMBODIMENT

Figure 4:
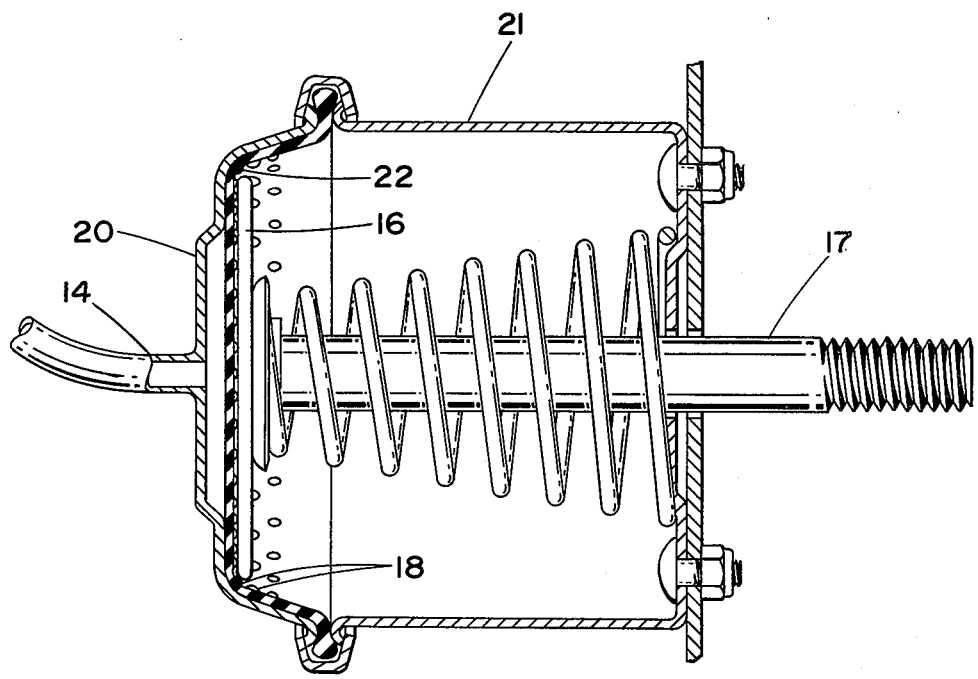
FIG. 4 is a vertical sectional view of an air brake actuator showing the primary and essential parts.

In the following description it is to be understood that a diaphragm may be generally formed of natural or synthetic rubber and other rubber-like materials having characteristic elastomeric physical properties which may be used in diaphragms as a substitute for or in combination with rubber. In general, the flexible brake diaphragm has a normally dish shaped configuration comprising a flange area 10 which is generally used to be secured within the housing, a top planar body portion 11 and an annulus sidewall 12. Generally, an internal fabric reinforcement 13 is fabricated and embedded between the top surface and the inner surface.

Generally speaking, the flange 10 is usually somewhat thicker and extends outwardly to provide easier means for retaining the diaphragm between the housing sections 20 and 21.

When the diaphragm is enclosed in a housing, such as shown in FIG. 4, the diaphragm conforms generally in shape to the upper housing 20. The fluid pressure, such as compressed air, may be admitted through a port 14 of the housing in order to deflect the diaphragm. The deflected diaphragm will therefore work against the follower plate 16 which is connected to the piston rod 17 which in turn is connected and used to operate and actuate the braking device or other associated device.

A portion of the diaphragm will undergo excessive abrasion by action of the follower plate 16 along the shoulder area 22 of the diaphragm, especially during misalignment. The area along the inner surface of the diaphragm will act as wearing buffers which will allow the piston to operate for a longer period of time in case of such misalignment. The protrusions will also allow the shifting of stresses such that the diaphragm will not undergo early failure because of localized stressed area.

In case of misalignment of the follower plate, the shoulder area 22 connecting the sidewall annulus 12 and the top planar portion 11, undergoes the greatest amount of abrasion and wear. It is known that lower durometer rubber will withstand such abrasion better than a higher durometer rubber. Even so, if one just relies on the normal wall guage of the rubber on the inside surface of the shoulder area 22, severely misaligned follower plates, or those that are not rigidly bracketed will induce premature wear of the wall, even to the point of wearing into any fabric reinforcement 13 internally placed in the diaphragm.

To protect against such premature wear, it has been found to be of substantial advantage to place wear surfaces, such as buttons 18, along the inner portion of the shoulder area 22 of the diaphragm. The buttons 18 may be hemispherical, pyramidal or truncated pyramidal in shape. It has been found that the hemispherical shape is the preferred one since it will provide a point contact allowing less wear to occur and actually minimizing total frictional forces against the follower plate 16 thereby allowing a degree of realignment of the follower plate against the diaphragm. Generally, the buttons 18 will be of maximum size at the area of greatest curvature of the shoulder 22 and will be of increasingly smaller size as the shoulder tapers into the top planar portion 11 and the annulus sidewall 12.

OTHER PREFERRED SPECIES

It has also been found that wear ridges 24 in the form of concentric ridges separated by grooves all located along the inside curved shoulder area 22 will work. Undulating ridges 25 offer a compromise to increase the wear surface by having areas both perpendicular to the line of radius of curvature of the shoulder and also areas more aligned in parallel to the line of radius of the shoulder area. The undulating configuration is therefore a compromise toward having greater wear over the strictly perpendicular ridges and yet allowing a degree of flexibility to provide some degree of realignment of the diaphragm against the follower plate. FIGS. 6 and 7 show these modifications.

Figures 2, 5:
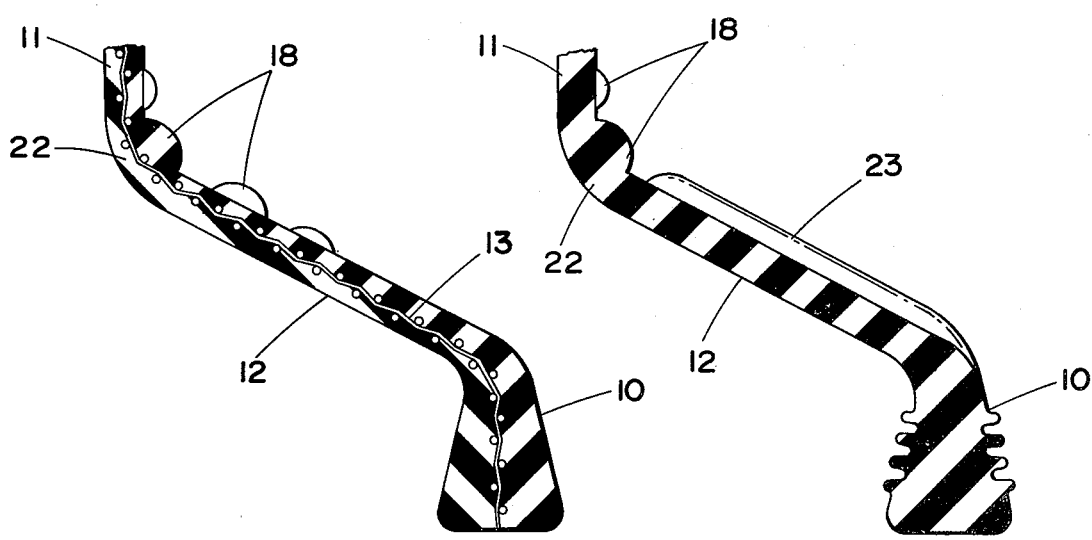
FIG. 2 is an enlarged portion of a section of FIG. 3 particularly pointing out a preferred embodiment of the present invention.
FIG. 5 is a section showing a portion of the inner surface of the diaphragm with the additional added modification of ribs spaced along the inner annular sidewall.

It should be recognized that the modes of the invention described have certain advantages over ribs as used in previously recited prior art. The ribs, for instance, make the diaphragm much less flexible in the annulus sidewall area 12. In addition, ribs provide a much more concentrated wear area and do not allow for the more flexible diaphragm with point contact and even distribution of wear stresses as provided by this invention. This invention by virtue of its point contact will provide a more consistent wear pattern than the ribs and will provide the realignment feature for a long period. However, it is sometimes desirable to have a stiffer less flexible diaphragm. In such cases, spaced apart ribs or buttons 23, as shown in FIG. 5, may be provided along the inner surface of the annulus sidewall 12. Care should be used to terminate the ribs 23 before they extend into the inner shoulder area 22 so as not to interfere with the action of the wear buttons 18. It is felt that this particular invention has particular application for certain characteristic wear, inducing designs that it is not intended as a universal type diaphragm but rather as a needed solution to a characteristic type need.

What we claim is:

1. In a fluid actuator system having a flat follower plate fully engaging all of a flat interior top planar surface of a dish shaped flexible diaphragm said diaphragm comprising:
   a flange;
   a top planar surface;
   an annular sidewall connecting said flange and top flat planar surface; and
   a multitude of raised buttons to engage the follower plate in the actuator system, said button disposed over the interior surface of a shoulder area consisting of a curved connecting portion between said top flat planar surface and said annular sidewall and said buttons also disposed on the interior surface of the immediately adjacent annular portions of said top flat planar surface and said annular sidewall connected to said shoulder area in order to accommodate misalignment of the follower plate as it coacts with the buttons on the inner surface of the shoulder area of the diaphragm.

2. A diaphragm according to claim 1 in which the buttons are substantially hemispherical shaped protuberances.

3. A diaphragm according to claim 1 in which the buttons are substantially pyramidal shaped protuberances.

4. A diaphragm according to claim 1 in which the buttons disposed on said annular sidewall comprise spaced apart ribs provided along the inner surface of the annular sidewall and ending at the juncture of the annular sidewall and the shoulder.

* * * * *